(12) United States Patent
Nos

(10) Patent No.: US 9,075,633 B2
(45) Date of Patent: Jul. 7, 2015

(54) CONFIGURATION OF LIFE CYCLE MANAGEMENT FOR CONFIGURATION FILES FOR AN APPLICATION

(71) Applicant: SAP AG, Walldorf (DE)

(72) Inventor: Kathrin Nos, Nussloch (DE)

(73) Assignee: SAP SE, Walldorf (DE)

( * ) Notice: Subject to any disclaimer, the term of this patent is extended or adjusted under 35 U.S.C. 154(b) by 269 days.

(21) Appl. No.: 13/650,430

(22) Filed: Oct. 12, 2012

(65) Prior Publication Data

US 2014/0108440 A1    Apr. 17, 2014

(51) Int. Cl.
*G06F 17/30* (2006.01)
*G06F 9/445* (2006.01)

(52) U.S. Cl.
CPC ........ *G06F 9/44505* (2013.01); *G06F 17/3023* (2013.01)

(58) Field of Classification Search
CPC ............ G06F 17/30; G06F 7/00; G06F 7/06; G06F 7/20; G06F 17/3023; G06F 9/44505

USPC .......................... 707/758, 803, 805, 625, 695
See application file for complete search history.

(56) References Cited

U.S. PATENT DOCUMENTS

| 6,886,018 | B1 * | 4/2005 | Boudris et al. | 707/625 |
| 7,386,839 | B1 * | 6/2008 | Golender et al. | 717/131 |
| 8,286,219 | B2 * | 10/2012 | Khalid et al. | 726/1 |
| 8,589,426 | B1 * | 11/2013 | Miles | 707/758 |

* cited by examiner

*Primary Examiner* — Vincent F Boccio
(74) *Attorney, Agent, or Firm* — Fountainhead Law Group PC

(57) ABSTRACT

A method for modifying a configuration file includes receiving a first configuration file for an application and receiving one or more changes to the first configuration file to generate a modified configuration file. When a second configuration file is received, differences between the first configuration file and the modified configuration file are determined, and differences between the first configuration file and the second configuration file are determined. The differences may then be presented to a user, who can then reconcile the differences.

20 Claims, 3 Drawing Sheets

CONFIGURATION OF LIFE CYCLE MANAGEMENT FOR CONFIGURATION FILES FOR AN APPLICATION

TECHNICAL FIELD

The present description relates to providing configuration information to a computing device for configuring an application, and in particular, to a method for configuration lifecycle management for configuration information for an application.

BACKGROUND

Unless otherwise indicated herein, the approaches described in this section are not prior art to the claims in this application and are not admitted to be prior art by inclusion in this section.

In the life cycle of a business application, updated configuration files are often provided to customers who use the application. Customers often import an updated configuration file to configure the application to their needs. Updated configuration files are also pushed out to customers for bug fixes, for adding functionality, etc.

The customer has the option to modify the configuration file to conform the operation of the application according to the customer's needs. If a customer modifies a configuration file and thereafter receives an updated configuration file, the user may have to change the updated configuration file manually so that changes from a prior configuration file can be made in the later configuration file. The customer typically has to keep track of their changes from prior configuration files so that the customer can make the same or similar changes to the later configuration file. Keeping track of changes and making the changes in the later configuration file can lead to a relatively high cost of use of the application.

DETAILED DESCRIPTION

Described herein are techniques for configuration life cycle management for configuration files for an application. In the following description, for purposes of explanation, numerous examples and specific details are set forth in order to provide a thorough understanding of the present embodiments. It will be evident, however, to one skilled in the art that the present embodiments as defined by the claims may include some or all of the features in these examples alone or in combination with other features described below, and may further include modifications and equivalents of the features and concepts described herein.

Figure 1:
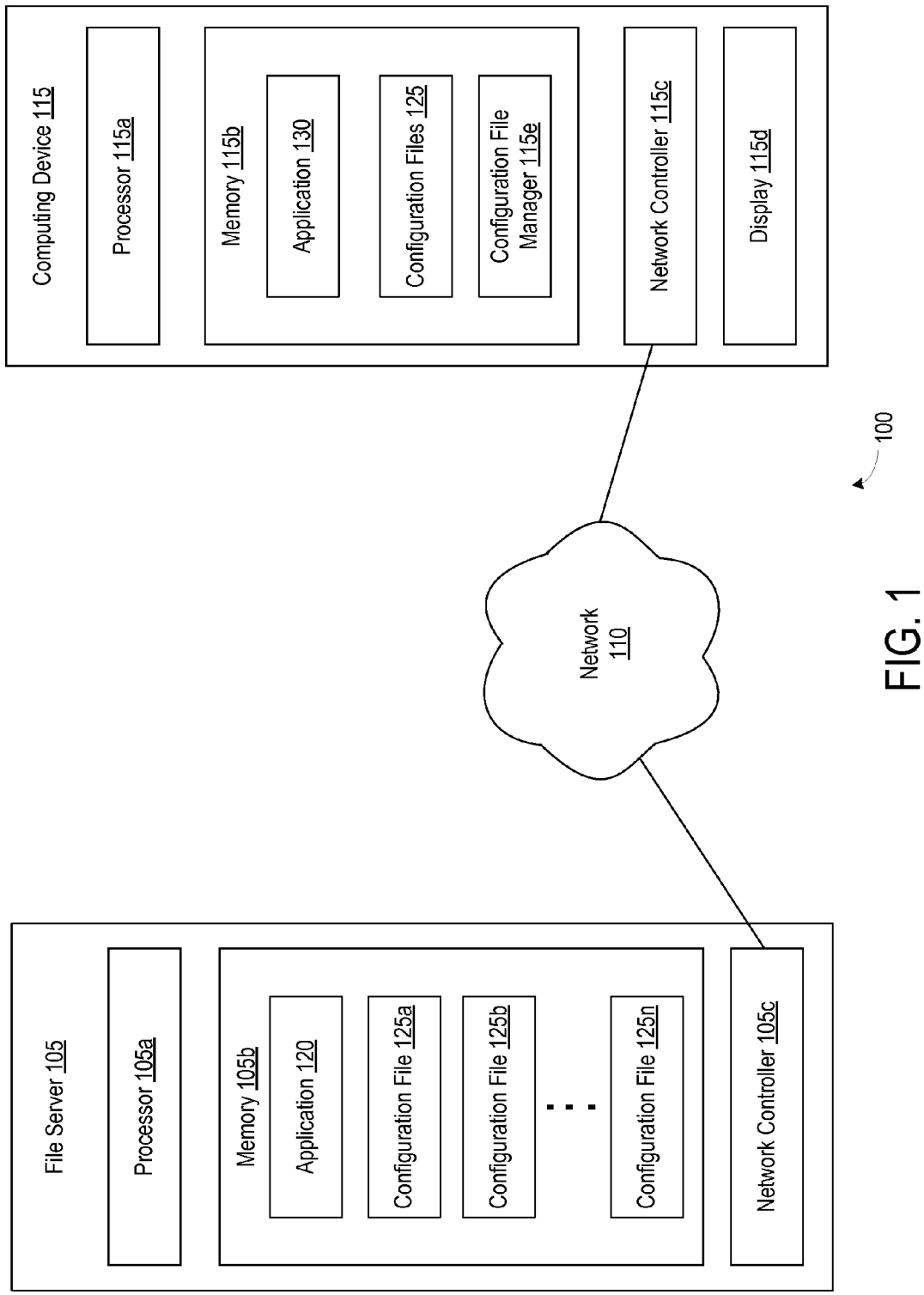
FIG. 1 illustrates a computing system according to one embodiment.

FIG. 1 illustrates a computing system 100 according to one embodiment. Computing system 100 includes a file server 105, a network 110, and a computing device 115. The file server 105 includes a processor 105a, a memory 105b, and a network controller 105c. The memory 105b may be a non-transitory computer readable storage medium that stores computer code for an application 120, a number of configuration files 125a, 125b ... 125n, or the like. The memory 105b may transfer the computer code for the application 120 to the processor 105a for execution.

The computing device 115 includes a processor 115a, a memory 115b, a network controller 115c, a display 115d, and a configuration file manager 115e. The memory 115b may be a non-transitory computer readable storage medium that stores an application 130 and one or more of the configuration files 125. The memory 115b may transfer the computer code for the application 130 to the processor 115a for execution. The configuration file manager 115e may be software, hardware, firmware, or a combination thereof. The memory 115b may store the configuration file manager 115e according to some embodiments.

According to one embodiment, network 110 may be comprised of a variety of communication networks such as one or more intranets, the Internet, etc. The network controllers 105c and 115c of the filer server 105 and the computing device 115 may control communications with the network 110.

The configuration files 125a-125n stored in file server 105 are presently described in further detail. According to one embodiment, the configuration files 125a-125n are markup language files, such as extensible markup language (XML) files. According to other embodiments, the configuration files 125a-125n may be expressed in other computer languages. Each of the configuration files 125a-125n includes configuration information that is used by the computing device 115 to configure the application 130.

According to one embodiment, the configuration files 125a-125n represent successive updates to the configuration information used for configuring the application 130 on computing device 115. The configuration files 125a-125n may be provided by the file server 105 to the computing device 115 as a series updates to the configuration information when revisions are made; e.g., to fix bugs, for feature enhancements, etc. For example, configuration file 125a may be the initial release of the configuration information, and configuration files 125b-125n may be subsequent releases of the configuration information. The configuration files are received by the computing device 115 are stored in memory 115b as configuration files 125.

According to one embodiment, each of the configuration file 125 that is received by the computing device 115 may be modified by the configuration file manager 115e and a modified configuration file may be generated based on the modification. The configuration file manager 115e may control generation of the modified configuration file. If the modified configuration file is generated, then the modified configuration file may be used by the configuration file manager 115e for configuring the application 130.

Figure 2:
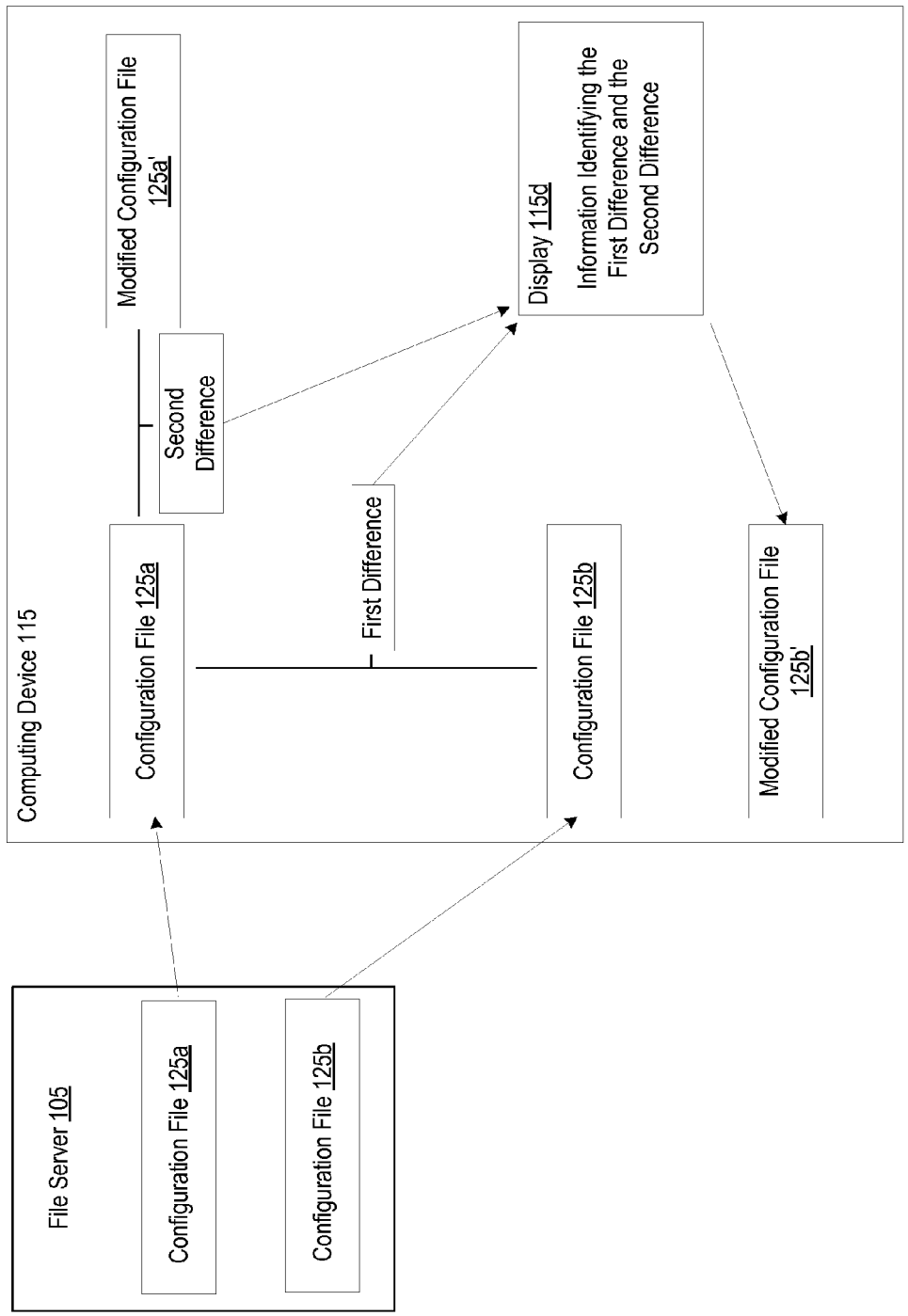
FIG. 2 depicts a work-flow diagram of the receipt of an initial configuration file by the computing device and the generation of a modified configuration file.

Reference is currently made to FIG. 2, which depicts a high-level flow diagram for the receipt of an initial configuration file 125a by the computing device 115 and the generation of a modified configuration file 125a'. The high-level flow diagram represents an example embodiment that is not limiting on the claims.

According to the example embodiment depicted in FIG. 2, the filer server 105 provides a configuration file 125a to the computing device 115; e.g., as an initial release. Thereafter, the configuration information included in the configuration file 125a may be changed by the configuration file manager 115e. The change may be based on input received by the computing device 115 from a user. Based on the change to the configuration information, the configuration file manager 115e may generate the modified configuration file 125a', which includes the changed configuration information.

According to an alternative embodiment, rather than generating the modified configuration file 125a' based on a change to the configuration information included in the configuration file 125, the configuration file manager 115e may determine whether the user would like to change the configuration information in the configuration file 125a. Thereafter the configuration file manager 115e may generate modified configuration file 125a' based on the determination. The modified configuration file 125a' may include the configuration information from the configuration file 125a. The configuration information included in the modified configuration file 125a' may be modified after the modified configuration file 125a' is generated. The configuration file manager 115e may then use the modified configuration file 125a' for configuring the application 130.

FIG. 2 further depicts the file server 105 providing another configuration file 125b to the computing device 115. The configuration file 125b may include revised configuration information or provide improvements over the configuration information that is in the previously provided configuration file 125a. For example, the configuration information that is in the configuration file 125b may fix a bug or add a new feature. The configuration file 125b may be provided to the computing device 115 after the configuration file 125a is provided to the computing device 115.

Prior to using the configuration file 125b for configuring the application 130, the configuration file manager 115e may determine a first difference between the configuration information that is in the configuration file 125a and the configuration file 125b, and may determine a second difference between the configuration information that is in the configuration file 125a and the modified configuration file 125a'. Thereafter, the computing device 115 may present the first difference and the second differences on the display 115d to notify the user of the first difference and the second difference. Based on the first difference and the second difference, the user can determine whether to make modification to the configuration information that is in the configuration file 125b. For example, the user may want to make similar changes to the configuration information that is in the configuration file 125b that were made to the configuration information that is in the configuration file 125a. Alternatively, the user might learn from the first difference and the second difference that the changes that the user made to the configuration information that is in the modified configuration file 125a' are included in the configuration file 125b. Accordingly, the user might decide not to modify the configuration file 125b. The management of the configuration files 125 in computing device 115 is described in further detail below with respect to FIG. 3.

According to one embodiment, each configuration file 125a-125n is associated with a configuration-file identifier that uniquely identifies the configuration file. The configuration-file identifiers may identify each version of the configuration files 125a-125n. According to one embodiment, the file server 105 stores the configuration-file identifiers and may identify the configuration files 125a-125n from the configuration-file identifiers.

Figure 3:
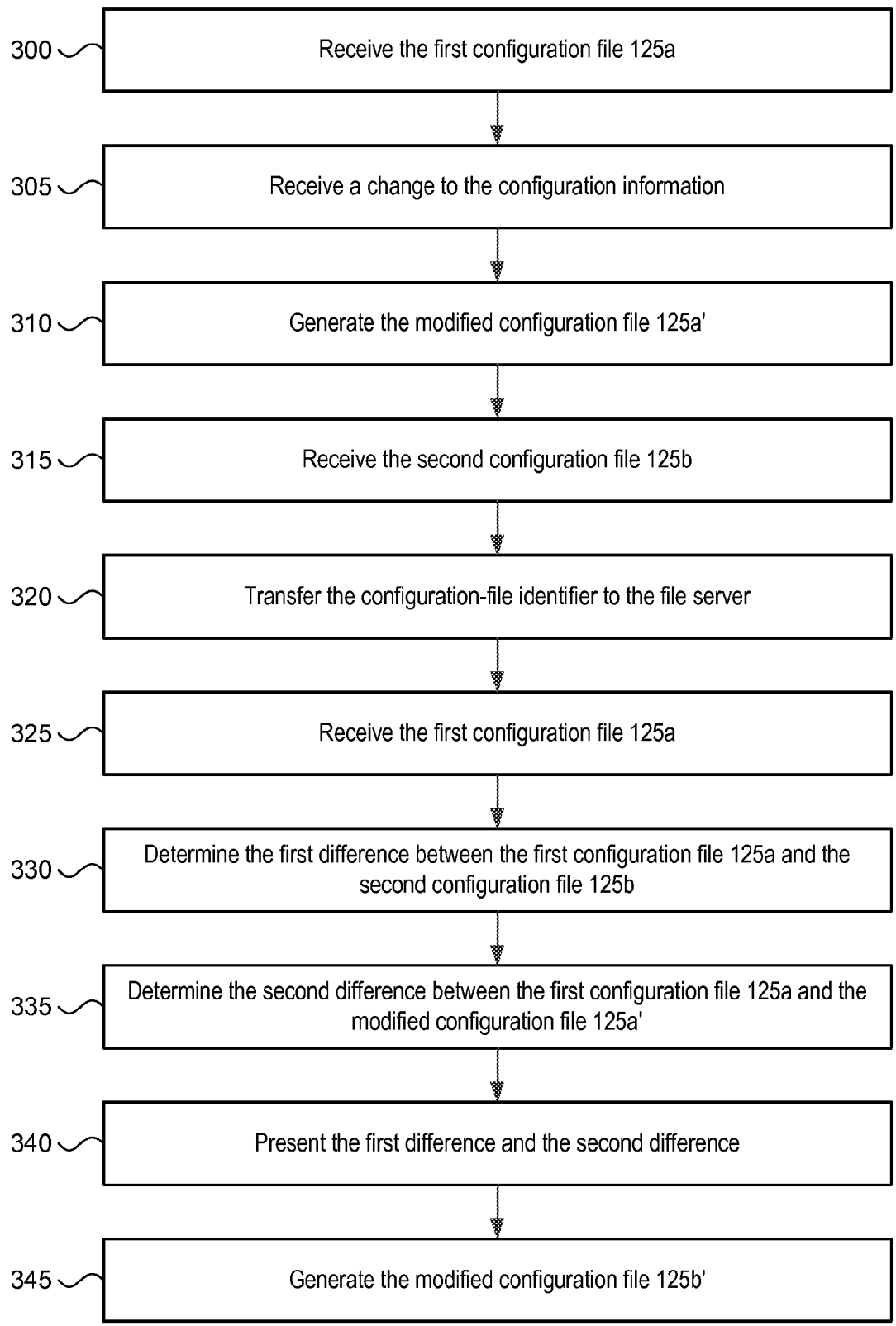
FIG. 3 depicts a high-level flow diagram of a method for managing configuration files.

Reference is currently made to FIG. 3, this figure depicts a high-level flow diagram of a method for managing the configuration files 125 in computing device 115. The high-level flow diagram represent an example embodiment and those of skill in the art will understand that various steps of the high-level flow diagram may be combined and/or added without deviating from the scope and the purview of the embodiment.

At 300, the computing device 115 receives the configuration file 125a from the file server 105. As described briefly above, the configuration file 125a includes a first version of the configuration information for configuring the application 130. The configuration file 125a may also include a configuration-file identifier that uniquely identifies the configuration file 125a.

At 305, the computing device 115 receives one or more changes to the first version of the configuration information that is included in configuration file 125a. The computing device 115 may receive the changes from a user who enters the changes into the computing device 115. The user may change the first version of the configuration information so that the application 130 operates according to the user's preferences.

At 310, the computing device 115 generates the modified configuration file 125a' that includes the changed configuration information. The modified configuration file 125a' may include the configuration-file identifier that identifies the configuration file 125a. If the configuration-file identifier for the configuration file 125a is not included in the modified configuration file 125a', then the computing device 115 may insert this configuration-file identifier into the modified configuration file 125a'.

At 315, the computing device 115 receives the configuration file 125b from the file server 105. For example, the configuration file 125b may be a second version of the configuration information for configuring the application 130. The first version and the second version of the configuration information are different and may configure the application 130 differently. For example, the second version of the application information may fix bugs in the application 130 that were not fixed by the first version of the application information.

After the computing device 115 receives the configuration file 125b from the file server 105, the computing device 115 examines the modified configuration file 125a' to determine the configuration-file identifier for the configuration file 125a. Thereafter, the computing device 115 may transfer the configuration-file identifier for the configuration file 125a to the file server 105 (step 320). Alternatively, the computing device may transfer the modified configuration file 125a' itself to the file server 105 (step 320). If the computing device 115 transfers the modified configuration file 125a' to the file server 105, the file server 105 may then examine the modified configuration file 125a' to determine the configuration-file identifier for the configuration file 125a.

Based on the configuration-file identifier received by the filer server 105 at step 320, the file server 105 may transfer the configuration file 125a to the computing device 115. This is the second transfer of the configuration file 125a to the computing device 115 may be necessary in case the copy of the configuration file 125a that was initially sent the computing device was modified (e.g., to create modified configuration file 125a') or otherwise deleted by the computing device. After the computing device 115 receives the configuration file 125a (step 325), the computing device 115 determines the first difference between the configuration information that is in the configuration file 125a and the configuration information that is in the configuration file 125b (step 330). The computing device 115 may compare the configuration file 125a and the configuration file 125b to determine the first difference. According to one alternative embodiment, the filer server 105 compares the configuration file 125a and the configuration file 125b to determine the first difference, and transfers information identifying the first difference to the computing device 115.

The computing device 115 may also determine the second difference between the configuration information that is in the configuration file 125*a* and the changed configuration information that is in the modified configuration file 125*a*' (step 335). The computing device 115 may compare the configuration file 125*a* and the modified configuration file 125*a*' to determine the second difference. According to the embodiment where the computing device 115 transfers the modified configuration file 125*a*' to the file server 105, the filer server 105 may determine the second difference and transfer the second information to the computing device 115 where the second information identifies the second difference.

At 340, the computing device 115 may present information for the first difference and the second differences to the user. For example, the computing device 115 may present information for the first difference and the second difference on the display 115*d*, or may transfer information for the first difference and the second difference to another computing device for display.

The information for the first difference informs the user of the changes that the user made to the configuration information that is in the configuration file 125*a*. The information for the second difference informs the user of the difference between the configuration information that is in the configuration file 125*b* and the configuration information that is in the configuration file 125*a*. Based on the first difference and the second difference, the user may determine whether to make changes to the configuration information that is in the configuration file 125*b* where the changes may be similar or the same as the changes that were made to the configuration information that is in configuration file 125*a*'. If changes are made to the configuration information that is in configuration file 125*b*, then, at 345, the computing device 115 may generate a modified configuration file 125*b*', which is a modified version of configuration file 125*b* that includes the changed configuration information and a configuration-file identifier that identifies the configuration file 125*b*.

Alternatively, the user may determine from the first difference and the second difference that the configuration information that is in the configuration file 125*b* already includes the changes that the user had made to the configuration information that is in the configuration file 125*a* at step 305. Accordingly, the user may decide not to change the configuration information that is in the configuration file 125*b*.

Steps 305 to 345 described above may be repeated for newly received configuration files. Thus, for example, if new configuration file (say 125*c*, not shown) comes in from the file server 105, then the computing device 115 may compute first and second differences. The first difference would be between configuration files 125*b* and 125*c* (the newly received configuration file), and the second difference would be between configuration files 125*b* and 125*b*'. A user may then create a modified configuration file 125*c*' (not shown) that is a modification of configuration file 125*c*, based on their assessment of the first and second differences as presented on display 115*d*. This lifecycle may be repeated for additional new configuration files from file server 105.

In accordance with a further aspect of the presently disclosed embodiments, the foregoing described lifecycle processing is applicable if the computing device 115 "skips" configuration files. Consider, for example, that file server 105 deploys configuration files 125*a*, 125*b*, 125*c*, 125*d*, 125*e*, 125*f*, etc. Suppose that computing device 115 receives and processes configuration files 125*a*, 125*b*, and 12*c* as explained above, but skips configuration files 125*d* and 125*e*. For example, an administrator in computing device 115 may determine that those configurations file were not needed and thus would not install them. In accordance with the present disclosure, the computing device 115 may nonetheless process the next configuration file 125*f* deployed by file server 105. Thus, first and second differences may be computed. In this case, the first difference would be computed from configuration files 125*c* and 125*f*, and the second difference would be computed from configuration file 125*c* and a modified configuration file 125*c*'. The user may then create modified configuration file 125*f* based on the user's assessment of the first and second differences presented on display 115*d*.

The above description illustrates various embodiments along with examples of how aspects of the present embodiments may be implemented. The above examples and embodiments should not be deemed to be the only embodiments, and are presented to illustrate the flexibility and advantages of the present embodiments as defined by the following claims. Based on the above disclosure and the following claims, other arrangements, embodiments, implementations and equivalents will be evident to those skilled in the art and may be employed without departing from the spirit and scope of the embodiments as defined by the claims.

What is claimed is:

1. A method for modifying a configuration file, the method comprising operating a computing device to perform steps of:
    receiving at a second computer a first configuration file from a first computer to configure an application to be executed on the second computer;
    receiving user input at the second computer and modifying the first configuration file to generate a second configuration file on the second computer to configure the application;
    determining that a third configuration file from the first computer has been received at the second computer, the third configuration file being a revised version of the first configuration file;
    retrieving the first configuration file;
    determining a first difference between the first configuration file and the third configuration file, representing differences in configuration files from the first computer;
    determining a second difference between the first configuration file and the second configuration file, representing differences in configuration files made by a user at the second computer; and
    receiving user input at the second computer and generating a fourth configuration file to configure the application based on the first difference and the second difference.

2. The method of claim 1, wherein retrieving the first configuration file comprises:
    identifying, from the third configuration file, a configuration file identifier that is configured to identify the first configuration file; and
    retrieving the first configuration file from a remote server based on the configuration file identifier.

3. The method of claim 1, further comprising:
    determining whether to modify the second configuration based on an examination of the first difference and the second difference, wherein generating the fourth configuration file is based on the determination.

4. The method of claim 3, wherein the examination of the first difference and the second difference includes the presentation of the first difference and the second difference on a display.

5. The method of claim 1, wherein generating the fourth configuration file includes storing in the fourth configuration file a configuration file identifier that is used to identify the second configuration file.

6. The method of claim 1, wherein the fourth configuration file is configured to consolidate the first difference and the second difference.

7. The method of claim 1, wherein the third configuration file was generated by the computing device.

8. A non-transitory computer-readable storage medium comprising instructions for modifying a configuration file, wherein the instructions, when executed, are for controlling a computing device to be configured for:
  receiving at a second computer a first configuration file from a first computer to configure an application to be executed on the second computer;
  receiving user input at the second computer and modifying the first configuration file to generate a second configuration file on the second computer to configure the application;
  determining that a third configuration file from the first computer has been received at the second computer, the third configuration file being a revised version of the first configuration file;
  retrieving the first configuration file;
  determining a first difference between the first configuration file and the third configuration file, representing differences in configuration files from the first computer;
  determining a second difference between the first configuration file and the second configuration file, representing differences in configuration files made by a user at the second computer; and
  receiving user input at the second computer and generating a fourth configuration file to configure the application based on the first difference and the second difference.

9. The non-transitory computer-readable storage medium of claim 8, wherein retrieving the first configuration file comprises:
  identifying, from the third configuration file, a configuration file identifier that is configured to identify the first configuration file; and
  retrieving the first configuration file from a remote server based on the configuration file identifier.

10. The non-transitory computer-readable storage medium of claim 8, further comprising:
  determining whether to modify the second configuration based on an examination of the first difference and the second difference, wherein generating the fourth configuration file is based on the determination.

11. The non-transitory computer-readable storage medium of claim 10, wherein the examination of the first difference and the second difference includes the presentation of the first difference and the second difference on a display.

12. The non-transitory computer-readable storage medium of claim 8, wherein generating the fourth configuration file includes storing in the fourth configuration file a configuration file identifier that is used to identify the second configuration file.

13. The non-transitory computer-readable storage medium of claim 8, wherein the fourth configuration file is configured to consolidate the first difference and the second difference.

14. The non-transitory computer-readable storage medium of claim 8, wherein the third configuration file was generated by the computing device.

15. A computing device for modifying a configuration file, the computing device comprising:
  a processor; and
  a non-transitory computer-readable storage medium comprising instructions for controlling the processor to be configured for:
  receiving at a second computer a first configuration file from a first computer to configure an application to be executed on the second computer;
  receiving user input at the second computer and modifying the first configuration file to generate a second configuration file on the second computer to configure the application;
  determining that a third configuration file from the first computer has been received at the second computer, the third configuration file being a revised version of the first configuration file;
  retrieving the first configuration file;
  determining a first difference between the first configuration file and the third configuration file, representing differences in configuration files from the first computer;
  determining a second difference between the first configuration file and the second configuration file, representing differences in configuration files made by a user at the second computer; and
  receiving user input at the second computer and generating a fourth configuration file to configure the application based on the first difference and the second difference.

16. The computing device of claim 15, wherein retrieving the first configuration file comprises:
  identifying, from the third configuration file, a configuration file identifier that is configured to identify the first configuration file; and
  retrieving the first configuration file from a remote server based on the configuration file identifier.

17. The computing device of claim 15, further comprising:
  determining whether to modify the second configuration based on an examination of the first difference and the second difference, wherein generating the fourth configuration file is based on the determination.

18. The computing device of claim 17, wherein the examination of the first difference and the second difference includes the presentation of the first difference and the second difference on a display.

19. The computing device of claim 15, wherein generating the fourth configuration file includes storing in the fourth configuration file a configuration file identifier that is used to identify the second configuration file.

20. The computing device of claim 15, wherein the third configuration file was generated by the computing device.

* * * * *